US012255422B2

(12) United States Patent
Li et al.

(10) Patent No.: US 12,255,422 B2
(45) Date of Patent: Mar. 18, 2025

(54) CONNECTOR AND CONNECTOR ASSEMBLY

(71) Applicant: Tyco Electronics (Shanghai) Co., Ltd., Shanghai (CN)

(72) Inventors: Jianxiong Li, Shanghai (CN); Yuchen Yang, Shanghai (CN); Haomai Yin, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 359 days.

(21) Appl. No.: 17/840,676

(22) Filed: Jun. 15, 2022

(65) Prior Publication Data

US 2022/0407264 A1 Dec. 22, 2022

(30) Foreign Application Priority Data

Jun. 18, 2021 (CN) ......................... 202121361427.6

(51) Int. Cl.
*H01R 13/639* (2006.01)
*H01R 13/502* (2006.01)
*H01R 13/631* (2006.01)

(52) U.S. Cl.
CPC ....... *H01R 13/639* (2013.01); *H01R 13/5025* (2013.01); *H01R 13/631* (2013.01)

(58) Field of Classification Search
CPC .............. H01R 13/639; H01R 13/5025; H01R 13/631; H01R 13/6272; H01R 13/6275
USPC .......................................................... 439/352
See application file for complete search history.

(56) References Cited

U.S. PATENT DOCUMENTS

| | | | | |
|---|---|---|---|---|
| 4,963,103 A * | 10/1990 | Fink | H01R 13/6272 | 439/352 |
| 5,120,240 A * | 6/1992 | Reider | H01R 13/6272 | 439/352 |
| 5,720,623 A * | 2/1998 | Polenick | H01R 13/641 | 439/352 |
| 6,077,101 A * | 6/2000 | Garretson | H01R 13/627 | 439/352 |
| 6,354,860 B1 * | 3/2002 | Miller | H01R 13/6272 | 439/352 |
| 6,435,895 B1 * | 8/2002 | Fink | H01R 13/6272 | 439/352 |

(Continued)

*Primary Examiner* — Gary F Paumen
(74) *Attorney, Agent, or Firm* — Potomac Law Group, PLLC

(57) ABSTRACT

A connector and a connector assembly are disclosed. The connector has a housing adapted to be inserted into a mating housing of a mating connector; an elastic latch provided on an outer wall of the housing and having a locking part for locking the mating housing and an unlocking part for unlocking the locking part; and a connection position safety mounted on the outer wall of the housing and adapted to be moved between a safety position to prevent the elastic latch from being unlocked and a pre locking position to allow the elastic latch to be unlocked. When the locking part is locked to the mating housing and the connection position safety is in the pre locking position, the unlocking part is hidden inside the connection position safety, so that human finger cannot contact the unlocking part. Therefore, the present invention can effectively prevent the elastic latch from being accidentally unlocked and improve the use safety of the connector.

19 Claims, 11 Drawing Sheets

(56) References Cited

U.S. PATENT DOCUMENTS

| | | | | |
|---|---|---|---|---|
| 7,326,074 | B1 * | 2/2008 | Lim | H01R 13/629 439/352 |
| 7,682,181 | B1 * | 3/2010 | Jones, Jr. | H01R 13/6272 439/352 |
| 8,678,846 | B2 * | 3/2014 | Hitchcock | H01R 13/6397 439/352 |
| 10,404,012 | B1 * | 9/2019 | Stoyanov | H01R 13/6272 |
| 2007/0264868 | A1 * | 11/2007 | Wolf | H01R 13/639 439/505 |

* cited by examiner

CONNECTOR AND CONNECTOR ASSEMBLY

CROSS-REFERENCE TO RELATED APPLICATION

This application claims the benefit of Chinese Patent Application No. 202121361427.6 filed on Jun. 18, 2021 in the State Intellectual Property Office of China, the whole disclosure of which is incorporated herein by reference.

BACKGROUND OF THE INVENTION

Field of the Invention

The present invention relates to a connector and a connector assembly comprising the connector.

Description of the Related Art

In the prior art, in order to realize the rapid electrical connection between cables or between cable and electrical equipment, plug connectors and socket connectors suitable for rapid mating are usually adopted. In the prior art, in order to prevent the separation of the matched plug connector and socket connector, an elastic latch is usually provided on the housing of the plug connector, which is suitable for locking the housing of the socket connector. Generally, the elastic latch can be unlocked so that the plug connector and the socket connector can be separated and reused.

In the prior art, in order to prevent the elastic latch from being accidentally unlocked due to wrong operation, it is necessary to set a connection position safety mechanism on the socket connector, which can move between the safety position and the pre locking position. After the plug connector is inserted into the socket connector, the elastic latch can be kept in the locked position by moving the connection position safety mechanism of the connection position to the safety position, so as to avoid the accidental unlocking of the elastic latch due to wrong operation. In the prior art, when the connection position safety mechanism is moved backward to the pre locking position, the human finger can contact the elastic latch, so that the elastic latch can be pushed to the unlocking position by the human finger, which leads to the risk of accidental unlocking of the elastic latch.

In addition, in the prior art, the elastic latch and the connection position safety mechanism are usually provided on the plug connector and the socket connector respectively, which leads to complex connector structure and high cost.

SUMMARY OF THE INVENTION

The present invention has been made to overcome or alleviate at least one aspect of the above mentioned disadvantages.

According to an aspect of the present invention, there is provided a connector comprises of: a housing adapted to be inserted into a mating housing of a mating connector; an elastic latch provided on an outer wall of the housing and having a locking part for locking the mating housing and an unlocking part for unlocking the locking part; and a connection position safety mounted on the outer wall of the housing and adapted to be moved between a safety position to prevent the elastic latch from being unlocked and a pre locking position to allow the elastic latch to be unlocked. When the locking part is locked to the mating housing and the connection position safety is in the pre locking position, the unlocking part is hidden inside the connection position safety, so that human finger cannot contact the unlocking part.

According to another exemplary embodiment of the present invention, the connection position safety is pre-installed on the housing before the connector is mated with the mating connector; a blocking part is formed on the elastic latch to block the connection position safety in a pre installation position and prevent the connection position safety from being moved to the safety position.

According to another exemplary embodiment of the present invention, during the connector is mated with the mating connector, the mating housing pushes the elastic latch to move the blocking part to a position separate from the connection position safety, so as to allow the connection position safety to be moved from the pre installation position to the safety position.

According to another exemplary embodiment of the present invention, when the locking part has not been locked to the mating housing and the connection position safety is in the pre locking position, the unlocking part of the elastic latch blocks the connection position safety in the pre locking position to prevent the connection position safety from being moved to the safety position.

According to another exemplary embodiment of the present invention, when the locking part has been locked to the mating housing and the connection position safety is in the pre locking position, the unlocking part is elastically reset to a position separate from the connection position safety, so as to allow the connection position safety to be moved from the pre locking position to the safety position.

According to another exemplary embodiment of the present invention, the elastic latch comprises: a cantilever part on which the locking part, the unlocking part and the blocking part are formed; and a fixing part connected with the cantilever part and fixedly installed on the housing, the locking part protrudes upward from the cantilever part and adapted to be locked into an opening on the mating housing.

According to another exemplary embodiment of the present invention, a slot is formed on the housing, and the fixing part is adapted to be inserted into the slot; an elastic latching piece is formed on the fixing part, and a blocking step is formed on the housing; when the fixing part is inserted into the slot, the elastic latching piece rests against the blocking step to prevent the fixing part from being pulled out of the slot.

According to another exemplary embodiment of the present invention, the blocking part comprises a pair of wings respectively formed on both sides of the cantilever part; the unlocking part is a free end of the cantilever part which is capable of being moved up and down elastically.

According to another exemplary embodiment of the present invention, the connection position safety comprises of: a pair of side walls; a top wall connected between the pair of side walls; and a connecting wall located below the top wall and connected between the pair of side walls. When the locking part is locked to the mating housing and the connection position safety is in the pre locking position, the unlocking part is hidden by the top wall, so that human finger cannot contact the unlocking part.

According to another exemplary embodiment of the present invention, a notch is formed on the top wall of the connection position safety, so as to allow the elastic latch to be pushed to the unlocking position by a tool inserted through the notch; the size of the According to another exemplary embodiment of the present invention, a slide rail is formed on one of the connecting wall of the connecting position safety and the outer wall of the housing, and a slide slot for mating with the slide rail is formed on the other, to allow the connecting position safety to slide back and forth along the slide rail.

According to another exemplary embodiment of the present invention, the connection position safety further comprises a pair of elastic locking arms respectively located on the inner sides of the pair of side walls, and the pair of elastic locking arms are connected to the front end of the connecting wall and extend forward; when the locking part is locked to the mating housing and the connection position safety is in the safety position, the pair of elastic locking arms are locked into the opening on the mating housing to hold the connection position safety in the safety position.

According to another exemplary embodiment of the present invention, the connection position safety also includes a pair of first blocking protrusions, which are respectively formed on the pair of elastic locking arms; when the connection position safety is in the pre installation position, the blocking part on the elastic latch butts against the first blocking protrusion of the connection position safety to prevent the connection position safety from being moved from the pre installation position to the safety position.

According to another exemplary embodiment of the present invention, the connection position safety also includes a beam, which is connected between the front ends of the pair of side walls of the connection position safety; a protruding part is formed on the outer wall of the housing; when the connection position safety is in the pre installation position, the protruding part on the housing butts against the beam of the connection position safety to prevent the connection position safety from being moved from the pre installation position toward a position separate from the housing.

According to another exemplary embodiment of the present invention, the connection position safety also includes a second blocking protrusion, which is connected to the front end of the connecting wall of the connection position safety; when the locking part has not been locked to the mating housing and the connection position safety is in the pre locking position, the unlocking part on the elastic latch butts against the second blocking protrusion of the connection position safety, to prevent the connection position safety from being moved from the pre locking position to the safety position.

According to another exemplary embodiment of the present invention, an insertion part is formed on the front end of the connecting wall of the connection position safety; when the locking part is locked to the mating housing and the connection position safety is in the safety position, the insertion part of the connection position safety is inserted below the unlocking part of the elastic latch to prevent the unlocking part from being pressed down to the unlocking position, so that the elastic latch is held in a locking position.

According to another exemplary embodiment of the present invention, a pair of limit protrusions are formed on the outer wall of the housing, and the pair of limit protrusions respectively butts against the outer sides of the pair of side walls of the connection position safety to prevent the lateral shaking of the connection position safety.

According to another aspect of the present invention, there is provided a connector assembly comprises the above connector and a mating connector suitable for mating with the connector, the mating connector comprises a mating housing having an insertion port, the connector is adapted to be inserted into the insertion port of the mating housing.

According to an exemplary embodiment of the present invention, an opening is formed on the mating housing, and the locking part of the connector is adapted to be locked into the opening.

In the above exemplary embodiments according to the present invention, when the elastic latch is locked to the mating housing and the connection position safety is in the pre locking position, the unlocking part is hidden inside the connection position safety, so that human finger cannot contact the unlocking part, which can effectively prevent the elastic In addition, in the above exemplary embodiments according to the present invention, the elastic latch and the connection position safety are provided in the same connector without being provided on the two matched connectors respectively. Therefore, the structure of the connector is simplified and the cost is reduced.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
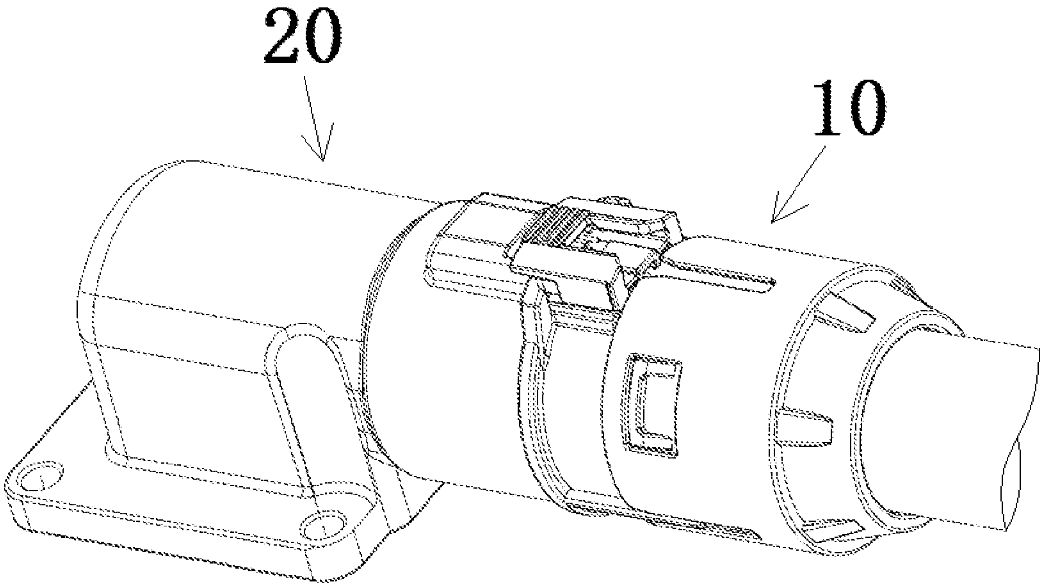
FIG. 1 shows an illustrative perspective view of a connector assembly according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a connector comprises of: a housing adapted to be inserted into a mating housing of a mating connector; an elastic latch provided on an outer wall of the housing and having a locking part for locking the mating housing and an unlocking part for unlocking the locking part; and a connection position safety mounted on the outer wall of the housing and adapted to be moved between a safety position to prevent the elastic latch from being unlocked and a pre locking position to allow the elastic latch to be unlocked. When the locking part is locked to the mating housing and the connection position safety is in the pre locking position, the unlocking part is hidden inside the connection position safety, so that human finger cannot contact the unlocking part.

Figure 2:
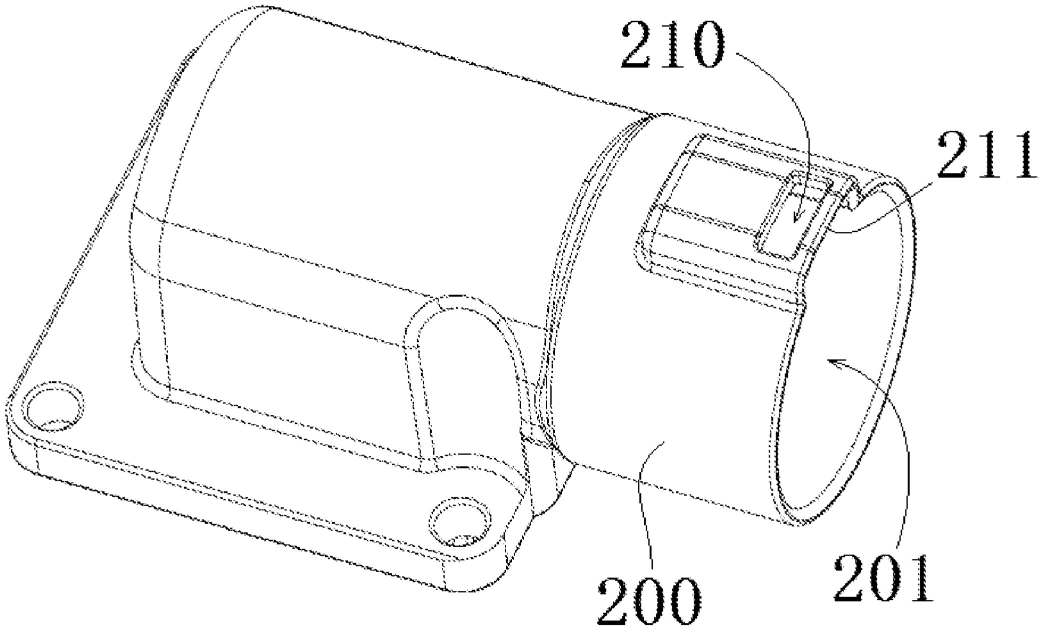
FIG. 2 shows an illustrative perspective view of the mating housing of the mating connector in the connector assembly shown in FIG. 1.
Figure 3:
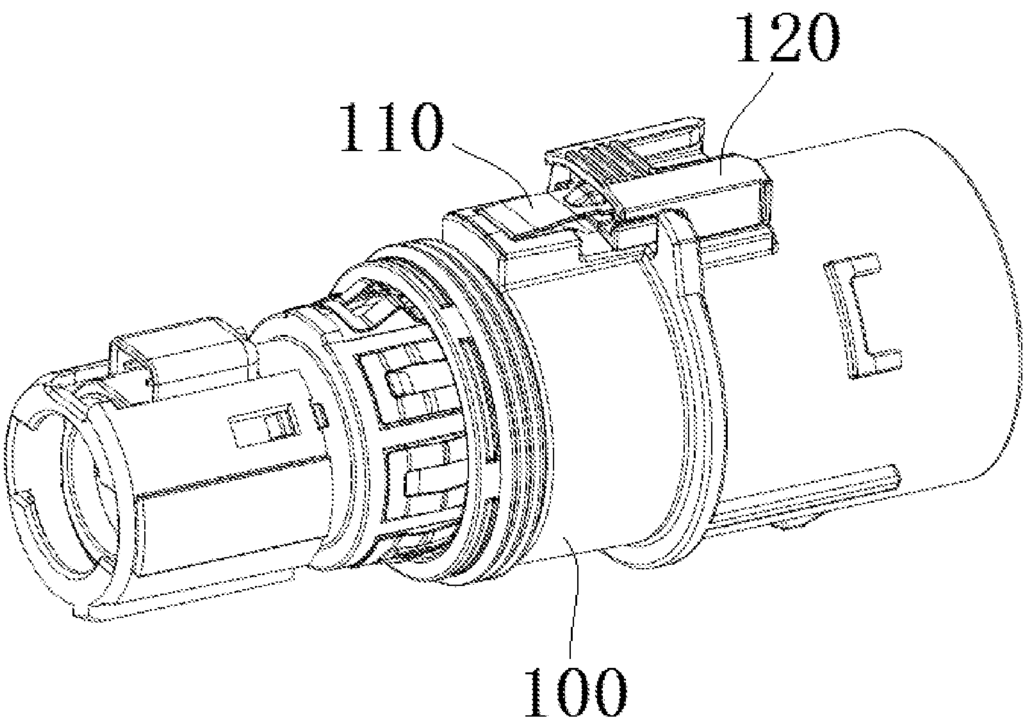
FIG. 3 shows an illustrative perspective view of the housing of the connector and the elastic latch and connection position safety installed on the housing in the connector assembly shown in FIG. 1.

FIG. 1 shows an illustrative perspective view of a connector assembly according to an exemplary embodiment of the present invention; FIG. 2 shows an illustrative perspective view of the mating housing 200 of the mating connector 20 in the connector assembly shown in FIG. 1; FIG. 3 shows an illustrative perspective view of the housing 100 of the connector 10, the elastic latch 110 installed on the housing 100 and the connection position safety 120 in the connector assembly shown in FIG. 1.

As shown in FIGS. 1 to 3, in the illustrated embodiment, the connector assembly mainly includes a connector 10 and a mating connector 20. The mating connector 20 is suitable for mating with the connector 10. The mating connector 20 includes a mating housing 200. The mating housing 200 has an insertion port 201. The housing 110 of the connector 10 is adapted to be inserted into the mating housing 200 of the mating connector 20 via the insertion port 201 to mate with the mating connector 20.

As shown in FIGS. 1 to 3, in the illustrated embodiment, an opening 210 is formed on the mating housing 200 of the mating connector 20. The locking part 111*a* of the elastic latch 110 on the connector 10 is adapted to be locked into the opening 210 to maintain the connector 10 and the mating connector 20 in the mating state.

Although not shown, in an exemplary embodiment of the present invention, a terminal is provided in the housing 100 of the connector 10 and a mating terminal is provided in the mating housing 200 of the mating connector 20. When the connector 10 and the mating connector 20 are mated together, the terminal of the connector 10 and the mating terminal of the mating connector 20 are mated together to realize the electrical connection between them.

Figure 4:
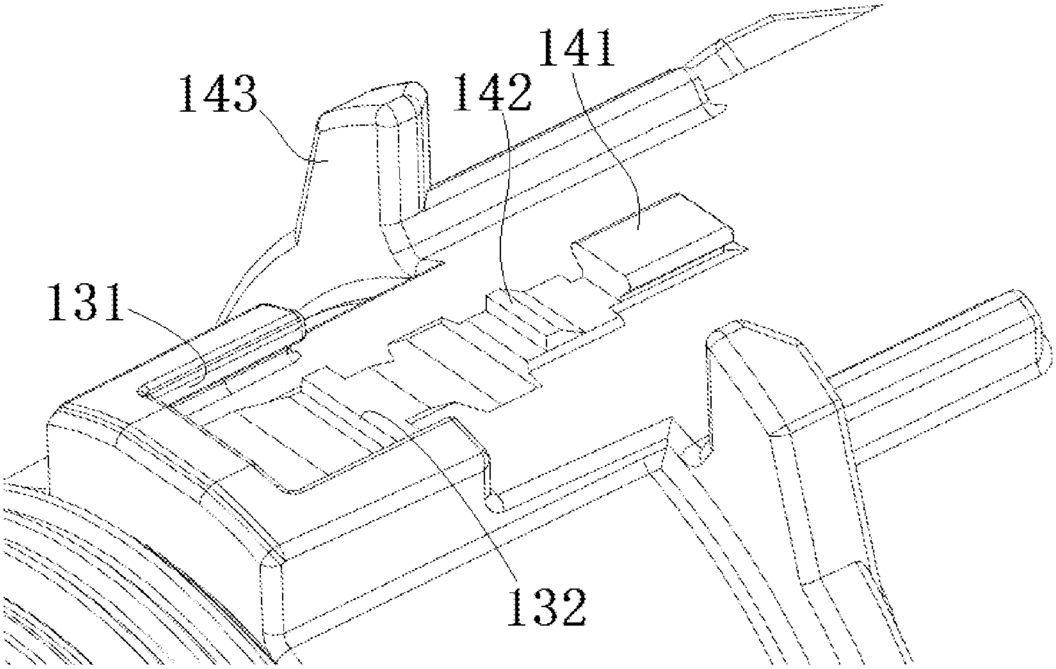
FIG. 4 shows an illustrative perspective view of the housing of the connector shown in FIG. 3, in which the elastic latch and the connection position safety are removed.
Figure 5:
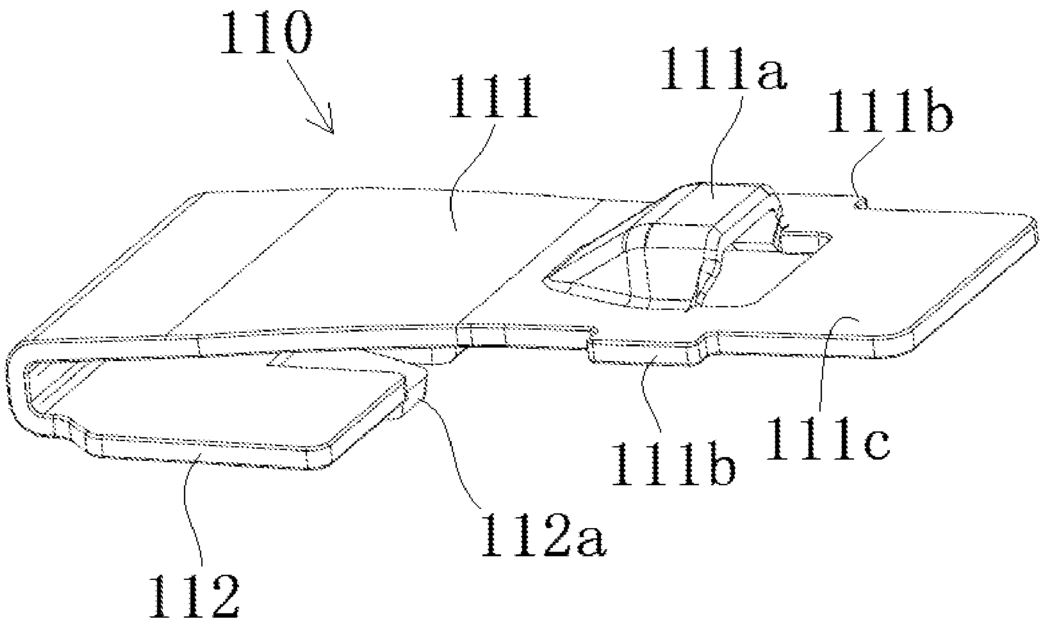
FIG. 5 shows an illustrative perspective view of an elastic latch according to an exemplary embodiment of the present invention.
Figure 6:
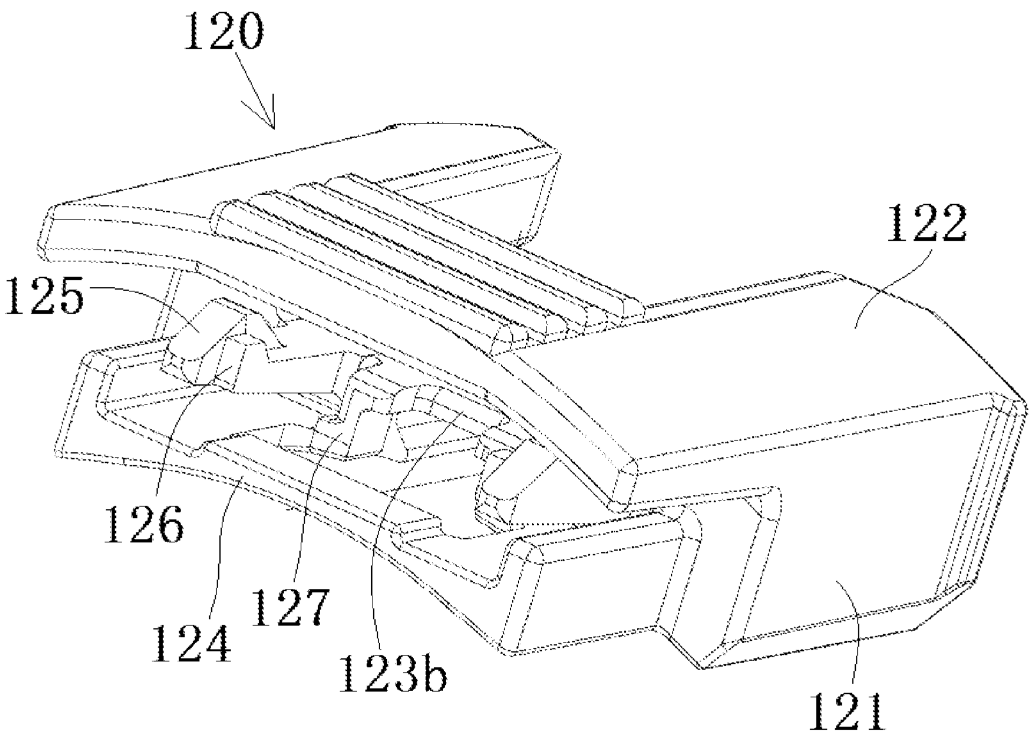
FIG. 6 shows an illustrative perspective view of a connection position safety according to an exemplary embodiment of the present invention.

FIG. 4 shows an illustrative perspective view of the housing 100 of the connector 10 shown in FIG. 3, in which the elastic latch 110 and the connection position safety 120 are removed; FIG. 5 shows an illustrative perspective view of an elastic latch 110 according to an exemplary embodiment of the present invention; FIG. 6 shows an illustrative perspective view of a connection position safety 120 according to an exemplary embodiment of the present invention.

As shown in FIGS. 1 to 6, in the illustrated embodiment, the connector 10 mainly includes a housing 100, an elastic latch 110, a connection position safety 120 and a terminal (not shown). The housing 100 is adapted to be inserted into the mating housing 200 of the mating connector 20. The elastic latch 110 is mounted on the outer wall of the housing 100 and has a locking part 111*a* suitable for locking the mating housing 200 and an unlocking part 111*c* for unlocking the locking part 111*a*. The connection position safety 120 is mounted on the outer wall of the housing 100 and is adapted to be moved between a safety position to prevent the elastic latch 110 from being unlocked and a pre locking position to allow the elastic latch 110 to be unlocked.

Figure 10:
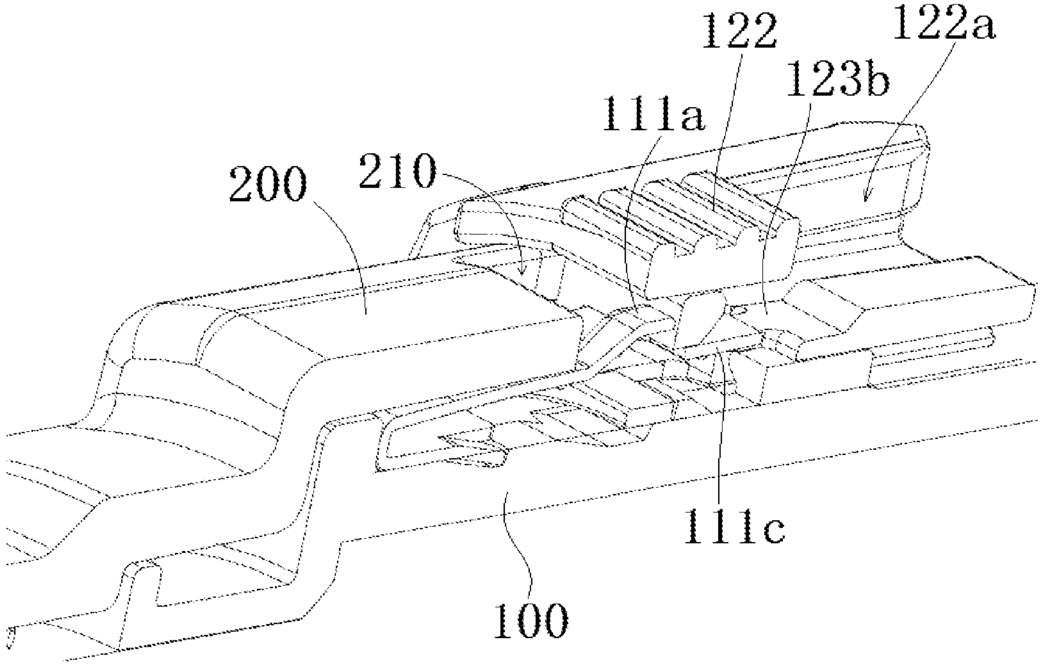
FIG. 10 shows a partially enlarged sectional view of the housing of the connector and the mating housing of the mating connector according to an exemplary embodiment of the present invention, wherein the elastic latch has been locked to the mating housing and the connection position safety is in the pre locking position.

FIG. 10 shows a partially enlarged cross-sectional view of the housing 100 of the connector 10 and the mating housing 200 of the mating connector 20 according to an exemplary embodiment of the present invention, wherein the elastic latch 110 has been locked to the mating housing 200 and the connection position safety 120 is in the pre locking position.

As shown in FIGS. 1-6 and 10, in the illustrated embodiment, when the locking part 111*a* of the elastic latch 110 is locked to the mating housing 200 and the connection position safety 120 is in the pre locking position, the unlocking part 111*c* is hidden inside the connection position safety 120 so that human finger cannot contact the unlocking part 111*c*. In this way, it can prevent the elastic latch 110 from being accidentally unlocked.

Figure 7:
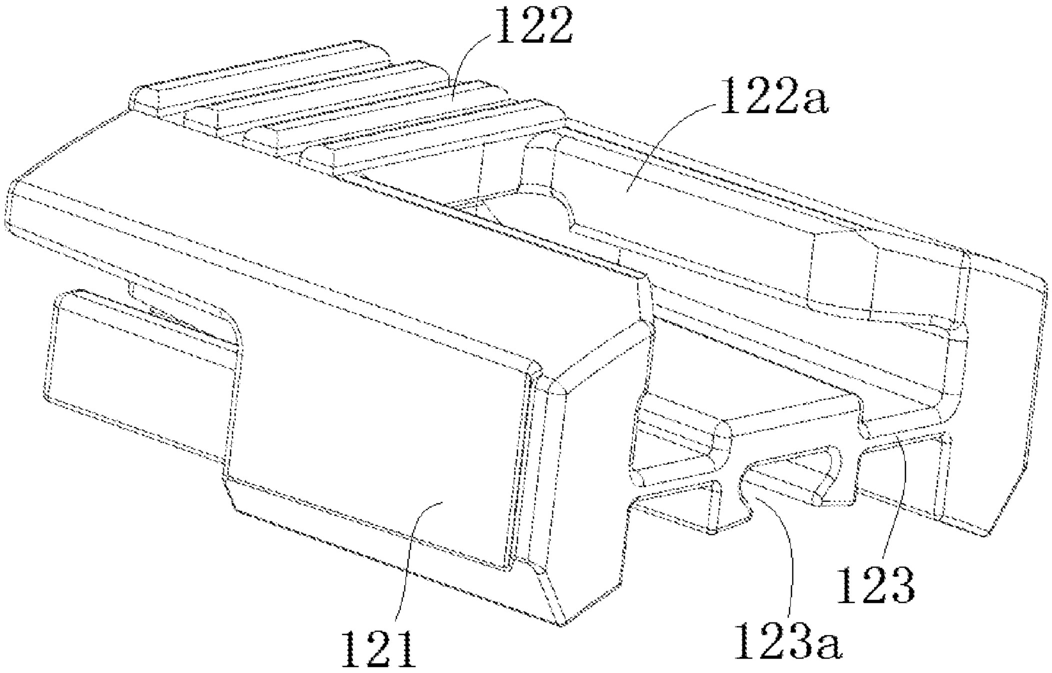
FIG. 7 shows an illustrative perspective view of the connection position safety shown in FIG. 6 when viewed from the rear.
Figure 8:
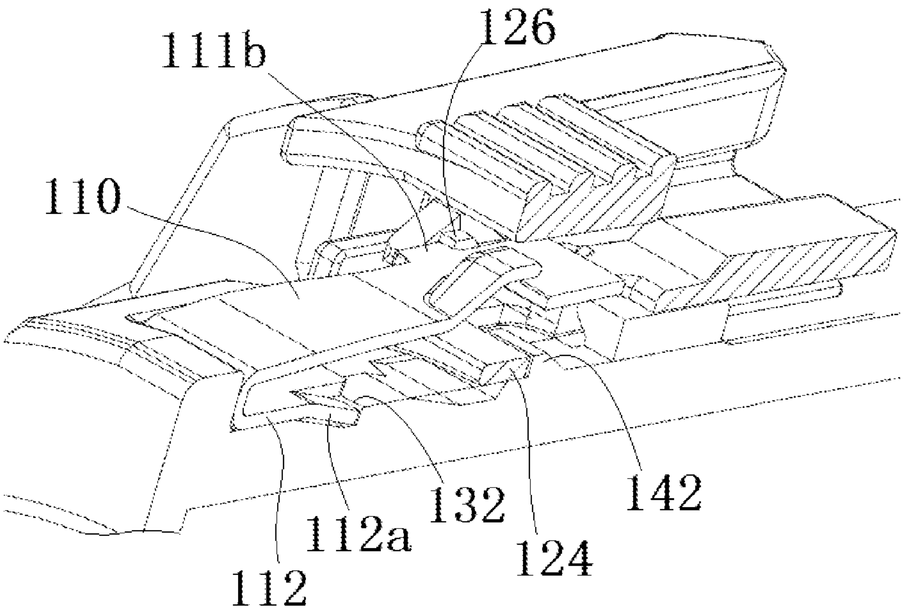
FIG. 8 shows a cross-sectional view of the housing of the connector and the elastic latch and connection position safety installed on the housing in the connector assembly shown in FIG. 1, wherein the connection position safety is in the pre installation position.

FIG. 7 shows an illustrative perspective view of the connection position safety 120 shown in FIG. 6 when viewed from the rear; FIG. 8 shows a cross-sectional view of the housing 100 of the connector 10, the elastic latch 110 mounted on the housing 100 and the connection position safety 120 in the connector assembly shown in FIG. 1, wherein the connection position safety 120 is in the pre installation position.

As shown in FIGS. 3 to 8, in the illustrated embodiment, the connection position safety 120 is pre-installed on the housing 100 before the connector 10 is mated with the mating connector 20. A blocking part 111*b* is formed on the elastic latch 110, which is used to block the connection position safety 120 in the pre installation position and prevent the connection position safety 120 from being moved forward to the pre locking position.

Figure 9:
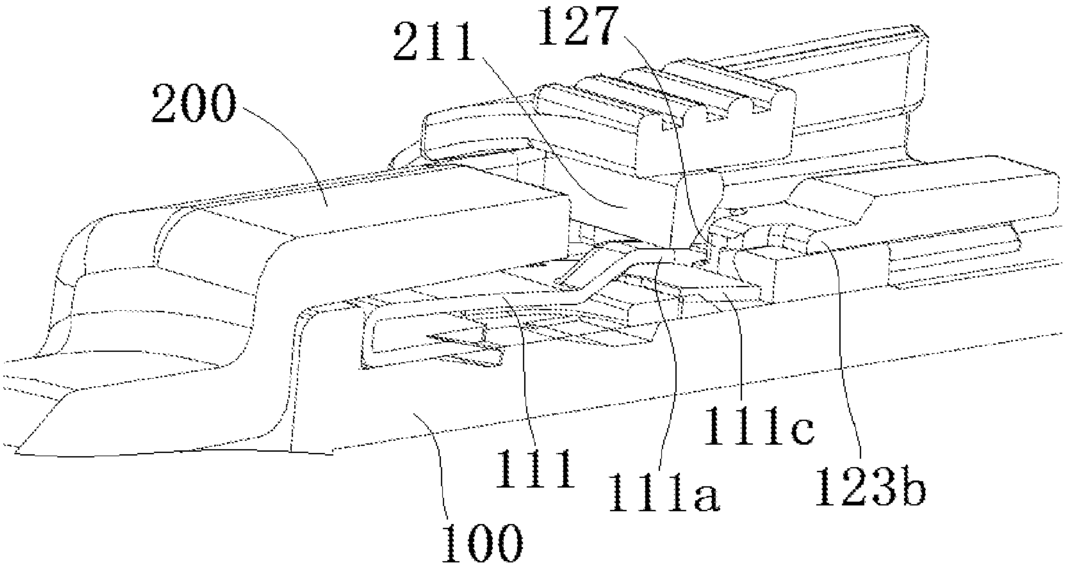
FIG. 9 shows a partially enlarged cross-sectional view of the housing of the connector and the mating housing of the mating connector, in which the elastic latch has not been locked to the mating housing and the connection position safety has been moved to the pre locking position.

As shown in FIGS. 2-3, the housing 100 of the connector 10 shown in FIG. 3 is adapted to mate with the mating housing 200 of the mating connector 20 shown in FIG. 2. FIG. 9 shows a partially enlarged cross-sectional view of the housing 100 of the connector 10 and the mating housing 200 of the mating connector 20 shown, in which the elastic latch 110 has not been locked to the mating housing 200 and the connection position safety 120 has been moved to the pre locking position.

As shown in FIGS. 1 to 9, in the illustrated embodiment, in the process of mating with the mating connector 20, the mating housing 200 pushes the elastic latch 110 to move the blocking part 111*b* to a position separate from the connection position safety 120, so as to allow the connection position safety 120 to be moved forward from the pre installation position to the pre locking position.

As shown in FIG. 9, in the illustrated embodiment, when the locking part 111*a* has not been locked to the mating housing 200 and the connection position safety 120 has been moved to the pre locking position, the unlocking part 111*c* of the elastic latch 110 blocks the connection position safety 120 in the pre locking position to prevent the connection position safety 120 from being moved toward the safety position.

As shown in FIG. 10, in the illustrated embodiment, when the locking part 111*a* has been locked to the mating housing 200 and the connection position safety 120 is in the pre locking position, the unlocking part 111*c* is elastically reset to the position separate from the connection position safety 120, to allow the connection position safety 120 to be moved forward from the pre locking position to the safety position.

As shown in FIGS. 3 to 5, in the illustrated embodiment, the elastic latch 110 mainly includes a cantilever part 111 and a fixing part 112. The locking part 111*a*, the unlocking part 111*c* and the blocking part 111*b* are formed on the cantilever part 111. The fixing part 112 is connected with the cantilever part 111 and fixedly mounted on the housing 100.

As shown in FIGS. 3 to 5, in the illustrated embodiment, the locking part 111*a* protrudes upward from the cantilever part 111, and the locking part 111*a* is adapted to be locked into the opening 210 on the mating housing 200.

As shown in FIGS. 3 to 5, in the illustrated embodiment, a slot 131 is formed on the housing 100, and the fixing part 112 is adapted to be inserted into the slot 131. An obliquely extending elastic latching piece 112*a* is formed on the fixing part 112, and a blocking step 132 is formed on the housing 100. When the fixing part 112 is inserted into the slot 131, the elastic latching piece 112*a* rests against the blocking step 132 to prevent the fixing part 112 from being pulled out of the slot 131.

As shown in FIGS. 3 to 5, in the illustrated embodiment, the blocking part 111*b* includes a pair of wings respectively formed on both sides of the cantilever part 111. The unlocking part 111*c* is a free end of the cantilever part 111 that can be elastically moved up and down.

As shown in FIGS. 3 to 7, in the illustrated embodiment, the connection position safety 120 mainly includes a pair of side walls 121, a top wall 122 and a connecting wall 123. The top wall 122 is connected between the pair of side walls 121. The connecting wall 123 is located below the top wall 122 and connected between the pair of side walls 121.

As shown in FIG. 10, in the illustrated embodiment, when the locking part 111*a* is locked to the mating housing 200 and the connection position safety 120 is in the pre locking position, the unlocking part 111*c* is hidden by the top wall 122 so that human finger cannot contact the unlocking part 111*c*.

As shown in FIG. 3-7 and FIG. 10, in the illustrated embodiment, a notch 122*a* is formed on the top wall 122 of the connection position safety 120. The size of the notch 122*a* is formed so that human finger cannot extend into, but a corresponding tool (not shown, such as a slotted screwdriver) can be inserted into and contact the unlocking part 111*c* to allow the elastic latch 110 to be pushed to the unlocking position by the inserted tool.

As shown in FIGS. 3 to 7, in the illustrated embodiment, a slide rail 141 is formed on one of the connecting wall 123 of the connection position safety 120 and the outer wall of the housing 100, and a slide slot 123*a* for mating with the slide rail 141 is formed on the other, so that the connection position safety 120 can slide forward and backward along the slide rail 141. The cross sections of the slide rail 141 and the slide slot 123*a* are dovetail shaped to slidably connect the connection position safety 120 to the housing 100. In this way, the connection position safety 120 cannot be separated from the housing 100 in a direction perpendicular to the slide rail 141.

As shown in FIGS. 3 to 7, in the illustrated embodiment, the connection position safety 120 also includes a pair of elastic locking arms 125 located on the inner sides of the pair of side walls 121, respectively. The pair of elastic locking arms 125 are connected to the front end of the connecting wall 123 and extend forward from the connecting wall 123.

Figure 11:
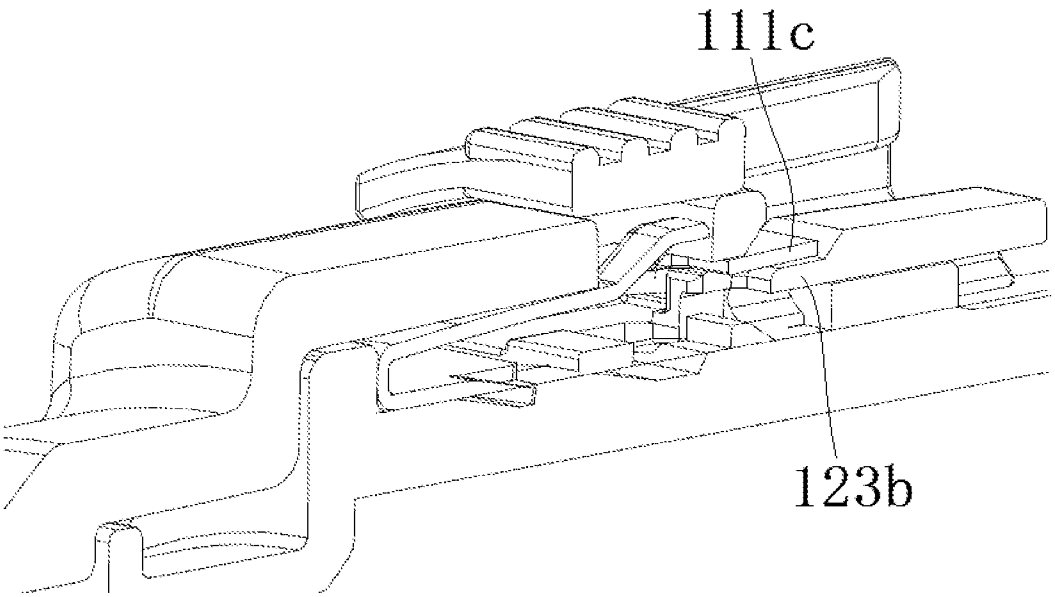
FIG. 11 shows a partially enlarged cross-sectional view of the housing of the connector and the mating housing of the mating connector according to an exemplary embodiment of the present invention, wherein the elastic latch has been locked to the mating housing and the connection position safety has been moved to the safety position.

FIG. 11 shows a partially enlarged cross-sectional view of the housing 100 of the connector 10 and the mating housing 200 of the mating connector 20 according to an exemplary embodiment of the present invention, wherein the elastic latch 110 has been locked to the mating housing 200 and the connection position safety 120 has been moved to the safety position.

As shown in FIGS. 1 to 11, in the illustrated embodiment, when the locking part 111*a* is locked to the mating housing 200 and the connection position safety 120 is in the safety position, the elastic locking arm 125 is locked into the opening 210 on the mating housing 200 to maintain the connection position safety 120 in the safety position.

As shown in FIGS. 3 to 7, in the illustrated embodiment, the connection position safety 120 also includes a pair of first blocking protrusions 126. The pair of first blocking protrusions 126 are respectively formed on the inner sides of the pair of elastic locking arms 125.

As shown in FIG. 8, in the illustrated embodiment, when the connection position safety 120 is in the pre installation position, the blocking part 111*b* on the elastic latch 110 butts against the first blocking protrusion 126 of the connection position safety 120 to prevent the connection position safety 120 from being moved forward from the pre installation position to the pre locking position.

As shown in FIGS. 3 to 7, in the illustrated embodiment, the connection position safety 120 also includes a beam 124 which is connected between the front ends of the pair of side walls 121 of the connection position safety 120. A protruding part 142 is formed on the outer wall of the housing 100.

As shown in FIG. 8, in the illustrated embodiment, when the connection position safety 120 is in the pre installation position, the protruding part 142 on the housing 100 butts against the beam 124 of the connection position safety 120 to prevent the connection position safety 120 from being moved backward from the pre installation position to a position separate from the housing 100.

As shown in FIGS. 3 to 7, in the illustrated embodiment, the connection position safety 120 also includes a second blocking protrusion 127 connected to the front end of the connecting wall 123 of the connection position safety 120.

As shown in FIG. 9, in the illustrated embodiment, when the locking part 111*a* has not been locked to the mating housing 200 and the connection position safety 120 is in the pre locking position, the unlocking part 111*c* on the elastic latch 110 butts against the second blocking protrusion 127 of the connection position safety 120 to prevent the connection position safety 120 from being moved forward from the pre locking position to the safety position.

As shown in FIGS. 3-7 and 11, in the illustrated embodiment, an insertion portion 123*b* is formed on the front end of the connecting wall 123 of the connection position safety 120. When the locking part 111*a* is locked to the mating housing 200 and the connection position safety 120 is in the safety position, the insertion portion 123*b* of the connection position safety 120 is inserted below the unlocking part 111*c* of the elastic latch 110 to prevent the unlocking part 111*c* from being pressed down to the unlocked position, so as to maintain the elastic latch 110 in the locking position.

As shown in FIGS. 3 to 7, in the illustrated embodiment, a pair of limit protrusions 143 are also formed on the outer wall of the housing 100, and the pair of limit protrusions 143 respectively butts against the outer sides of the pair of side walls 121 of the connection position safety 120 to prevent the connection position safety 120 from shaking laterally.

The mating process between the connector 10 and the mating connector 20 of the present invention will be described below with reference to the accompanying drawings.

First, as shown in FIG. 8, the connection position safety 120 is in the pre installation position and is held in the pre installation position by the blocking part 111*b* on the elastic latch 110 and the protruding part 142 on the housing 100;

Then, in the process of inserting the housing 100 into the mating housing 200, the end wall 211 of the mating housing 200 pushes the elastic latch 110 downward to move the blocking part 111*b* to a position separate from the connection position safety 120, so as to allow the connection position safety 120 to be moved forward from the pre installation position shown in FIG. 8 to the pre locking position shown in FIG. 9;

Then, as shown in FIG. 9, when the locking part 111*a* on the elastic latch 110 has not entered into the opening 210 on the mating housing 200, the unlocking part 111*c* of the elastic latch 110 blocks the connection position safety 120 in the pre locking position to prevent the connection position safety 120 from being moved forward to the safety position;

Then, as shown in FIG. 10, when the locking part 111*a* on the elastic latch 110 is locked into the opening 210 on the mating housing 200, the unlocking part 111*c* is elastically reset to the position separate from the connection position safety 120 to allow the connection position safety 120 to be moved forward from the pre locking position of FIG. 10 to the safety position;

Finally, as shown in FIG. 11, the connection position safety 120 is moved forward to the safety position, so that the insertion part 123*b* of the connection position safety 120 is inserted below the unlocking part 111*c* of the elastic latch 110 to prevent the unlocking part 111*c* from being pressed down to the unlocking position, so as to maintain the elastic latch 110 in the locking position.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. References to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a housing adapted to be inserted into a mating housing of a mating connector;

an elastic latch provided on an outer wall of the housing and having a locking part for locking the mating housing and an unlocking part for unlocking the locking part; and a connection position safety mounted on the outer wall of the housing and adapted to be moved between a safety position to prevent the elastic latch from being unlocked and a pre locking position to allow the elastic latch to be unlocked, wherein when the locking part is locked to the mating housing and the connection position safety is in the pre locking position, the unlocking part is hidden inside the connection position safety, so that a human finger cannot contact the unlocking part.

2. The connector according to claim 1, wherein the connection position safety is pre installed on the housing before the connector is mated with the mating connector;

wherein a blocking part is formed on the elastic latch to block the connection position safety in a pre installation position and prevent the connection position safety from being moved to the safety position.

3. The connector according to claim 2, wherein during the connector is mated with the mating connector, the mating housing pushes the elastic latch to move the blocking part to a position separate from the connection position safety, so as to allow the connection position safety to be moved from the pre installation position to the safety position.

4. The connector according to claim 3, wherein when the locking part has not been locked to the mating housing and the connection position safety is in the pre locking position, the unlocking part of the elastic latch blocks the connection position safety in the pre locking position to prevent the connection position safety from being moved to the safety position.

5. The connector according to claim 4, wherein when the locking part has been locked to the mating housing and the connection position safety is in the pre locking position, the unlocking part is elastically reset to a position separate from the connection position safety, so as to allow the connection position safety to be moved from the pre locking position to the safety position.

6. The connector according to claim 3, wherein the elastic latch comprises of:

a cantilever part on which the locking part, the unlocking part and the blocking part are formed; and a fixing part connected with the cantilever part and fixedly installed on the housing, wherein the locking part protrudes upward from the cantilever part and adapted to be locked into an opening on the mating housing.

7. The connector according to claim 6, wherein a slot is formed on the housing, and the fixing part is adapted to be inserted into the slot;

wherein an elastic latching piece is formed on the fixing part, and a blocking step is formed on the housing;

wherein when the fixing part is inserted into the slot, the elastic latching piece rests against the blocking step to prevent the fixing part from being pulled out of the slot.

8. The connector according to claim 6, wherein the blocking part comprises a pair of wings respectively formed on both sides of the cantilever part; and wherein the unlocking part is a free end of the cantilever part which is capable of being moved up and down elastically.

9. The connector according to claim 3, wherein the connection position safety comprises of:

a pair of side walls;

a top wall connected between the pair of side walls; and a connecting wall located below the top wall and connected between the pair of side walls, wherein when the locking part is locked to the mating housing and the connection position safety is in the pre locking position, the unlocking part is hidden by the top wall, so that human finger cannot contact the unlocking part.

10. The connector according to claim 9, wherein a notch is formed on the top wall of the connection position safety, so as to allow the elastic latch to be pushed to the unlocking position by a tool inserted through the notch;

wherein the size of the notch is formed so that a human finger cannot be insert therein.

11. The connector according to claim 9, wherein a slide rail is formed on one of the connecting wall of the connecting position safety and the outer wall of the housing, and a slide slot for mating with the slide rail is formed on the other, to allow the connecting position safety to slide back and forth along the slide rail.

12. The connector according to claim 9, wherein the connection position safety further comprises a pair of elastic locking arms respectively located on the inner sides of the pair of side walls, and the pair of elastic locking arms are connected to the front end of the connecting wall and extend forward;

wherein when the locking part is locked to the mating housing and the connection position safety is in the safety position, the pair of elastic locking arms are locked into the opening on the mating housing to hold the connection position safety in the safety position.

13. The connector according to claim 12, wherein the connection position safety also includes a pair of first blocking protrusions, which are respectively formed on the pair of elastic locking arms;

wherein when the connection position safety is in the pre installation position, the blocking part on the elastic latch butts against the first blocking protrusion of the connection position safety to prevent the connection position safety from being moved from the pre installation position to the safety position.

14. The connector according to claim 9, wherein the connection position safety also includes a beam, which is connected between the front ends of the pair of side walls of the connection position safety;

wherein a protruding part is formed on the outer wall of the housing;

wherein when the connection position safety is in the pre installation position, the protruding part on the housing butts against the beam of the connection position safety to prevent the connection position safety from being moved from the pre installation position toward a position separate from the housing.

15. The connector according to claim 9, wherein the connection position safety also includes a second blocking protrusion, which is connected to the front end of the connecting wall of the connection position safety;

wherein when the locking part has not been locked to the mating housing and the connection position safety is in the pre locking position, the unlocking part on the elastic latch butts against the second blocking protrusion of the connection position safety, to prevent the connection position safety from being moved from the pre locking position to the safety position.

16. The connector according to claim 9, wherein an insertion part is formed on the front end of the connecting wall of the connection position safety;

wherein when the locking part is locked to the mating housing and the connection position safety is in the safety position, the insertion part of the connection position safety is inserted below the unlocking part of the elastic latch to prevent the unlocking part from being pressed down to the unlocking position, so that the elastic latch is held in a locking position.

17. The connector according to claim 9, wherein a pair of limit protrusions are formed on the outer wall of the housing, and the pair of limit protrusions respectively butts against the outer sides of the pair of side walls of the connection position safety to prevent the lateral shaking of the connection position safety.

18. A connector assembly, comprising:

a connector, comprising:

a housing adapted to be inserted into a mating housing of a mating connector;

an elastic latch provided on an outer wall of the housing and having a locking part for locking the mating housing and an unlocking part for unlocking the locking part; and a connection position safety mounted on the outer wall of the housing and adapted to be moved between a safety position to prevent the elastic latch from being unlocked and a pre locking position to allow the elastic latch to be unlocked; and a mating connector adapted to mate with the connector and comprising a mating housing having an insertion port, wherein the connector is adapted to be inserted into the insertion port of the mating housing, wherein when the locking part is locked to the mating housing and the connection position safety is in the pre locking position, the unlocking part is hidden inside the connection position safety, so that human finger cannot contact the unlocking part.

19. The connector assembly according to claim 18, wherein an opening is formed on the mating housing, and the locking part of the connector is adapted to be locked into the opening.

* * * * *